April 29, 1958     R. A. E. COURAUD     2,832,223
SEAL
Filed Jan. 13, 1953     2 Sheets-Sheet 1
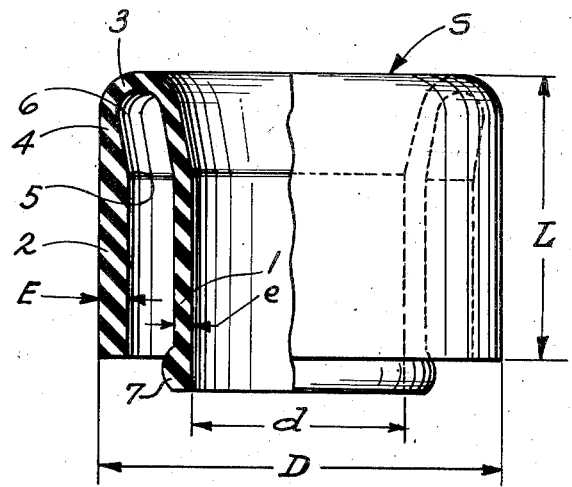
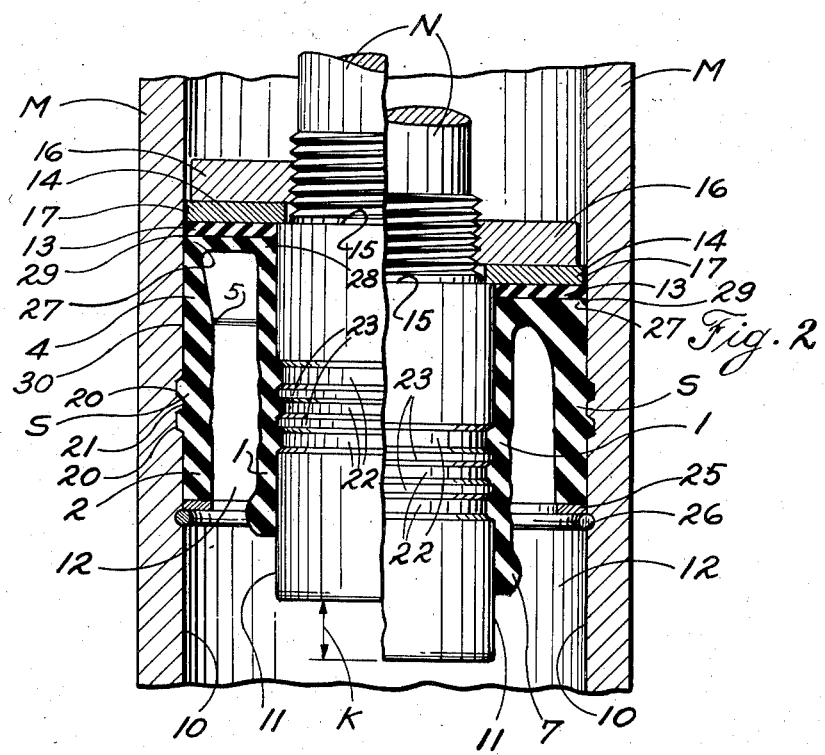
INVENTOR.
RAYMOND ANDRE ELIE COURAUD
BY
ATTORNEYS April 29, 1958   R. A. E. COURAUD   2,832,223
SEAL
Filed Jan. 13, 1953   2 Sheets-Sheet 2

INVENTOR.
RAYMOND ANDRE ELIE COURAUD

ATTORNEYS

United States Patent Office 2,832,223
Patented Apr. 29, 1958

2,832,223

SEAL

Raymond André Elie Couraud, Courbevoie, France, assignor to Paul D. Wurzburger, Cleveland Heights, Ohio Application January 13, 1953, Serial No. 330,951

8 Claims. (Cl. 74—18.2)

This invention relates to the art of sealing fluids under pressure and more particularly to effecting a fluid seal against both very high fluid pressures, as in excess of 10,000 pounds per square inch and also nominal pressures, as of about 1 to 10 pounds per square inch, as well as intermediate pressures, in respect to a pair of relatively longitudinally movable members throughout a predetermined range of movement therebetween. A valve body with a non-rotatable valve stem illustrates such members.

One of the problems to which my invention is addressed is that of the failure of the so-called rolling or folding type of seal, characterized by its annular form of U-shaped section, to seal against very high pressures and to seal against both high and quite low or nominal pressures. Such prior art seals also tend to fail by rupture under distention, wrinkling, spalling and pinching out at the moving gap between the sealed members. Another general problem to which my invention is addressed is that of the limitations and deficiencies of the familiar O-ring seal particularly in respect to high pressure work, sealing facility against both high and low pressure and cold flow and extrusion and binding at the gap between the moving members.

It is therefore among the objects of my invention to solve the problems mentioned above. Another object is to provide a fluid pressure seal for relatively movable members capable of holding pressures in excess of 10,000 pounds per square inch without deleteriously impairing freedom of movement between the sealed members and with assurance of long life and good wear resistance in the sealing elements. Another object is to provide a seal that not only operates effectively and efficiently at high pressures but is also effective against nominal and very low pressures such as a few pounds per square inch as in an idle system where a small static head persists under stand-by or non-operating conditions. Another object is to provide a novel sealing element of rubber-like material devoid of extraneous reinforcing material and to provide a novel combination of parts coacting therewith to effect fluid sealing and preservation of the element. Another object is to provide a novel combination including a rubber-like sealing element and to effect a working of the latter largely characterized by internal flow of the rubber-like stock in compression without, however, wrinkling the compressed parts or otherwise impairing their life and efficacy. Another object is to provide against capillary or low pressure leakage past the seal. Another object is to provide a seal having some or all the above desired characteristics that is inherently self-sealing and self-adjusting especially in the sense that it tends inherently to assume and retain a beneficial sealing relation to the sealed members without extraneous clamping, assisting and securing instrumentalities. Another object is to provide a seal endurable and efficient against hydraulic shocks and impacts. Another object is to provide a seal with the above desirable characteristics that is economical to make, facile in installation and reliable in use.

Other objects and advantages will appear from the following description of preferred forms of my invention reference being had to the accompanying drawings in which:

Figure 1 is an elevation partly in section of the flexible sealing element employed in my invention;

Figure 2 is a longitudinal sectional view of the combination of two relatively longitudinally movable members with the seal of Figure 1 in operative and sealing coaction therewith; the parts being shown in two different relative positions in the right and left halves of the figure;

Figure 3:
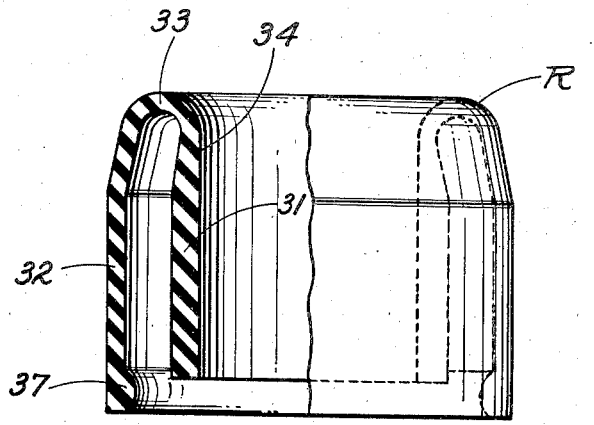
Figure 3 is a view corresponding to Figure 1 showing a different form of my sealing element adapted for coaction with relatively movable members such as shown in Figure 4.

Referring now more particularly to the form of my invention shown in Figures 1 and 2, the flexible sealing element S comprises a double-wall annulus in which the inner wall 1 is coaxial of and concentric with the outer wall 2 and is joined integrally therewith through a reentrant folded hemi-torous-like portion 3. The sealing element S, therefore, is U-shaped in longitudinal section with the spaced annular walls 1 and 2 comprising the spaced legs of the U and the return bend or folded portion 3 comprising the base of the U. Preferably the seal S is made, preferably molded, of fluid impervious natural or synthetic rubber or rubber-like material of high flexibility and elasticity wherewith to give the portions of the seal that are worked most vigorously when the sealed members have one relative movement much facility to flow internally under compression and to change shape and/or swell without wrinkling, and then freely return to normal, original, idle or slightly distended shape when the parts have opposite movement. In furtherance of this purpose and operation the greater portion of the length of the leg 2 is thick in relation to its length and substantially thicker than either the leg 1 or the return bend 3 of the seal, and the upper, as viewed, part 4 of the leg 2 preferably tapers in thickness smoothly from about the point 5, where it has the full thickness of the thickest portion of the leg 2 to about the point 6 where it is reduced to the thickness of the return bend 3 and the leg 1. I also prefer that the center of curvature of the bend 3 be offset slightly toward the leg 2, as shown, and the upper portion of the leg 1 be inclined outwardly with a flare of about 20° from the axis of the seal and smoothly joined with the straight portion of the leg 1 and the curve of the bend 3. The lowermost end of the thinner inner annular leg 1 is preferably thickened in the form of an annular bead 7 to enhance the gripping strength of that leg, i. e. wall, upon the member with which it is to be engaged. Preferably the inner faces of the legs are well spaced apart, as about equal to the sum of their thickness, whereby to provide interior space within which the parts that are worked by thickening have space and freedom to do so.

An embodiment of my invention is illustrated with the seal S coacting with the relatively longitudinally movable coaxially disposed members M and N, Figure 2, between whose concentric spaced cylindrical surfaces 10 and 11 the seal S is disposed and performs its function of retaining fluid under pressure in the annular space 12 within and below the seal. In Figure 2 the coaction, mode of operation and disposition of the parts is illustrated under the conditions when a high fluid pressure is exerted in the space 12 and, as viewed in the left half of the figure, when the member N is in its extreme upward position of travel in relation to the member M, and as viewed in the right half of the figure, when the member N is in its extreme downward position of travel in relation to the member M. As also shown in Figure 2 the sealing means or seal also comprises a relatively hard rubber or rubber-like washer 13 bearing upon and being borne upon by the closed end of the sealing element S. The washer 13 is substantially harder than the seal S, preferably having a durometer hardness of about 75 to 80 and has strength and stiffness resistant to more than a very little change in shape under the conditions of its use. The washer 13 has its inside and outside diameters closely corresponding to the outside and inside diameters respectively of the surfaces 11 and 10 of the members N and M, whereby when the system is subjected to operating fluid pressure the washer 13 has a snug sliding fit with the surface 10 and a snug static fit with the surface 11. The outer peripheral surface of the washer 13 is made preferably as smooth and true as practicable to have uniform contact and wiping engagement with the surface 10. The washer 13 is backed up substantially entirely across its upper, as viewed, face so that as fluid pressure is exerted upon its lower, as viewed, face it tends to be expanded radially within the limits of its hardness and thickness, both of which are proportioned to the end that a tight sliding and wiping contact is provided between the outer periphery of the washer 13 and the smooth cylindrical surface 10 of the member M short, however, of binding the parts or inducing deleteriously high frictional loads that would impair satisfactorily free movement between the members M and N under the conditions of very high pressure where my seal has novel advantages and utility.

Characteristic of the operation of my invention under high fluid pressure is the support and engagement of the closed, upper, as viewed, end of the seal S, through the washer 13 with an annular abutment carried by one or the other of the members between which the seal is disposed. In the form of my invention illustrated in Figure 2 the abutment comprises an annular strong rigid metallic disc or washer 14, the inner margin of which rests upon and is held firmly against an annular shoulder 15 of the member N by a nut 16 having threaded engagement with the shank or the member N. The outer peripheral marginal edge of the abutment 14 has a close free sliding fit with the cylindrical surface 10 of the member M as at 17. Preferably the abutment 14 fits the surface 10 as closely as good manufacturing tolerances permit with about .003" to .004" clearance at the annular space or gap 17. The washer 13 is therefore entirely supported by the abutment 14 except as it overhangs the small gap 17, and the washer 13 has strength and toughness which prevents it from being forced, spalled or extruded into the gap.

Comparison of the left and right halves of Figure 2 suggest that a major part of the coaction between the abutment 14 and the seal S is largely characterized by the compressing and swelling out and thickening of the tapered portion 4 of the leg 2 and the adjacent parts of the seal when the inner member N moves from its upward to its downward position and the corresponding reduction in thickness back to substantially the original idle dimensions when the member N returns to its uppermost position; the main parts of the legs 1 and 2 of the seal meanwhile remain immovably related or attached to the surfaces 10 and 11 of the members M and N.

To retain particularly the lower portions of the legs and/or annular walls 1 and 2 of the seal in fixed relation to the surfaces 11 and 10 respectively of the members N and M and the fluid-tight and/or adhesive contact therewith to prevent leakage between the legs and adjacent surfaces and, having in mind that high fluid pressure within the seal works in favor of this desired adhesion and leak-proofness, I prefer that the external diameter of the straight cylindrical wall of the leg 2 in its idle free state be somewhat greater than the inside diameter of the cylindrical surface 10 so that, without deleteriously impairing the facility of assembly of the seal into and within the surface 10, the leg 2 be stressed in circumferential compression whereby to have a positive external expansive reaction against the surface 10. Correspondingly I prefer that the interior straight cylindrical surface of the lower portion of the leg 1 and the beaded end 7 thereof be of somewhat smaller diameter than the surface 11 so that the leg 1 will be pre-stressed in circumferential tension giving it a reactive grip upon the member N and the surface 11 thereof when the parts are first assembled. In this instance also my purpose is that this difference in diametrical dimension be such as to give a good working grip between the wall 1 and the member N without however deleteriously impairing the facility of assembly of the parts. It may be noted in passing that the preferred assembly of the parts which I contemplate is primarily or firstly manual and secondarily that final disposition of the parts may result from the initial imposition of high fluid pressure which tends to force the seal upwardly as viewed in Figure 2, forcing the walls and closed end of the seal to or toward conformity with the surfaces 10 and 11 and the lower face of the abutment 14 more or less as shown in the left side of Figure 2.

To augment the adhesion and inhibit capillary leakage, especially at low fluid pressure between the lower portions of the legs 1 and 2 of the seal with the surfaces 11 and 10 of the members N and M, I prefer that the surface 10 have a plurality of shallow spaced annular grooves 20 with one or more lands 21 therebetween into which grooves the adjacent parts of the leg 2 tend to expand by their inherent pre-stress and elasticity and into which the material of the leg 2 is forcibly displaced by the influence of high fluid pressure in the space 12, i. e. between the legs of the seal. A plurality of similar grooves 22 with intervening lands 23 are cut in the surface 11 of the member N for similar coaction with the leg 1. Under high pressure conditions the grooves and lands tend to anchor and hold as well as seal the legs of the seal to the members M and N, and, at least equally important, the stressed coaction of the legs with the lands between the grooves effectively prevents leakage or capillary leakage therebetween when the fluid pressure is so low that it exerts little or no pressure between the legs of the seal.

I prefer that final assembly of the seal in relation to the members N and M also comprise the provision of a fixed abutment for the lower, as viewed, end of at least the leg 2. For illustration I have shown an annular washer 25 fixedly and removably held in respect to the member M by a snap ring 26, which washer and snap ring are so disposed in relation to the abutment 14 that the washer 25 will have a firm compressive upward push against the bottom end of the leg 2 tending to flatten out at least appreciably the bend 3 of the seal against the abutment 14 when the parts are in the "relaxed" and assembled position as somewhat "oversuggested" in the left half of Fig. 2 but in the absence of fluid pressure. A similar washer or abutment may, if desired, be provided under and bearing against the bottom of the bead 7 of the leg 1, but for reasons presently to appear may often be omitted.

In the left half of Figure 2 the element N is in its uppermost, as viewed, position of travel relative to the member M, and the sealing element S is in its corresponding and most extended and transversely squeezed and thinned condition, assuming the fluid pressure in the space 12 is at a high working pressure of about or above 10,000 pounds per square inch. Under these conditions the walls of the seal S are forcibly flattened against the surfaces 10 and 11 and into the grooves 20 and 22 and against the washer 13, while however the legs and connecting bend portions of the seal are not substantially or much tensioned or stretched longitudinally as viewed in longitudinal section in Fig. 2. That is to say, while the idle curves of the upper portions of the seal S, as viewed in Fig. 1, are flattened out in part and altered to have abrupt bends as at the upper corners 27 and 28, my preference is that these parts and portions be not substantially stretched or distended and be so near an overall unstretched state as to give great freedom of internal flexure and bending at the corners 27 and 28 whereby to snuggle fully into the corners where the washer 13 engages the surfaces 10 and 11 without tending to rupture the exterior surfaces of the seal adjacent thereto.

When the member N moves downwardly from the position shown in the left of Fig. 2 toward the position shown in the right of the figure the first increments and steps of motion tend to change the internal or over-all tension, if any, in the upper, as viewed, parts of the seal S to compression. As the member N with the abutment 14 and washer 13 moves downwardly the whole of the inner leg 1, by virtue of its attachment and adhesion to the surface 11, as well as the inner corner 28 tends not to be compressed directly by this movement, but on the other hand the upper part of the outer leg 2 and the outer corner 27 tends to be compressed and/or swollen and fattened as the movement proceeds since the lower part of the leg 2 remains fixed in relation to the member M. The extreme outer annular corner edge 29 of the corner 27 has the greatest travel during the relative movement of the members N and M, and under conditions of high fluid pressure in the space 12, I doubt, as presently advised, that the extreme outer corner edge 29 of the seal S has any significant motion relative to the washer 13 while having maximum sliding motion relative to the surface 10. The stock of the seal in and adjacent the corner edge 29 is closely supported by the washer 13 at the line of sliding and wiping contact between the washer and the surface 10, and, except for being in an increasing state of compression as the motion proceeds, is relaxed in respect to being drawn or pushed away from the moving line of contact between the washer and the surface 10 whereby the stock of the seal S at the edge 29 is readily wiped and pushed down along the surface 10 without tending to spall off or be ruptured or extruded between the washer and the surface 10. Downward movement of the member N while causing a relative internal "flow" or displacement of the stock of the seal to build up and fatten the corner 27 and the adjacent part 4 of the leg 2 and, more or less, the adjacent flattened part of the bend 3 does not require or substantially effect any bodily sliding of the external surfaces of the seal against the contiguous surfaces except in diminishing increments and proportions from the edge 29 down for a limited distance in the upper outer surface of the leg 2. Thus for a stroke K of the member N relative to the member M the edge 29 will have a travel equal along the surface 10 to K, but a point 30 on the exterior surface of the leg 2 near and above the upper groove 20 will have little or no motion with respect to the surface 10, and a point midway between the line 29 and the point 30 will tend to move somewhat less than K/2 relative to the surface 10.

As suggested also by comparison of the left and right halves of Figure 2 the internal flow of the stock of the seal not only "fattens" out the corner 27 and greatly "fattens" the upper part of the part 4 of the leg 2 but also "fattens" progressively downwardly more or less the upper and inner portion of the lower part of the leg 2, the initial thickness of which is agreeable to "fattening" as the parts above it are "fattened" and is therefore resistant to wrinkling and/or losing its adhesive and continuous bond with the surface 10. The thicker leg 2 may therefore be regarded as an expansible reservoir or cushion of stock elastically receptive of internally flowing stock on the down-stroke of the member N and elastically paying out and returning stock on the upstroke of the member N.

To facilitate the slip or sliding motion between the outer upper portions of the leg 2 and the surface 10 the latter is preferably ground or polished smoothly and the former cured and molded as smoothly as practicable, and, in all events these surfaces and the adjoining surfaces are provided with lubricant or anti-friction material such as talc when the parts are assembled. The provision of such lubricant all around the upper exterior parts of the sealing member S has additional utility when operation under low pressure conditions is had. Then when the fluid pressure forces the upper portions of the seal less vigorously against, for example, the lower face of the washer 13 some slippage by the seal across that face may be accommodated advantageously by the lubricant.

While the proportions of the parts of the sealing element S are intended to be fairly represented in the drawings, taken with the within description, the tabulation below taken with the dimensional letters D, d, E, e and L of Figure 1 will furnish specific examples of sizes and proportions of the sealing element that I have found useful particularly for high pressure operations at and fairly above 10,000 to 12,000 pounds per square inch. For the sake of round numbers the dimensions tabulated are given in millimeters, as follows:

| Example No. | D | d | E | e | L | Stroke K |
| --- | --- | --- | --- | --- | --- | --- |
| 1 | 17.0 | 7.0 | 1.5 | 1.0 | 16.0 | 5.0 |
| 2 | 23.0 | 11.5 | 1.75 | 1.25 | 19.0 | 5.5 |
| 3 | 35.0 | 18.0 | 2.0 | 1.25 | 21.0 | 6.5 |
| 4 | 58.0 | 33.0 | 2.0 | 1.25 | 23.0 | 7.5 |

While many known materials may be chosen and used for the seal S, having regard for the principles and teaching of my invention, a few examples are given for illustration in the premises and with especial regard for sealing high pressure fluids in the ranges mentioned above. When the fluids to be retained are not expected to depart radically from room temperature I have found Perbunan synthetic rubber Shore durometer hardness of about 60–65 with tensile strength of about 22,500 pounds per square inch, density of about 1 and minimum elongation without rupture of about 200% satisfactory, reasonable care being exercised to refrain from exposing the Perbunan to liquids or gases that have a deleterious effect upon it. Neoprene of similar specifications and with its known limitations in respect to certain fluids has been found satisfactory for my purposes when the fluids to be sealed have, however, temperatures as high as about 120° C. Perbunan special synthetic rubber with Shore durometer hardness of about 60 tensile strength of about 27,000 pounds per square inch, density of about 1.2 and elongation without rupture up to about 300% is satisfactory for fluids up to about 140° C., excepting, of course, fluids that effect it deleteriously.

Figure 4:
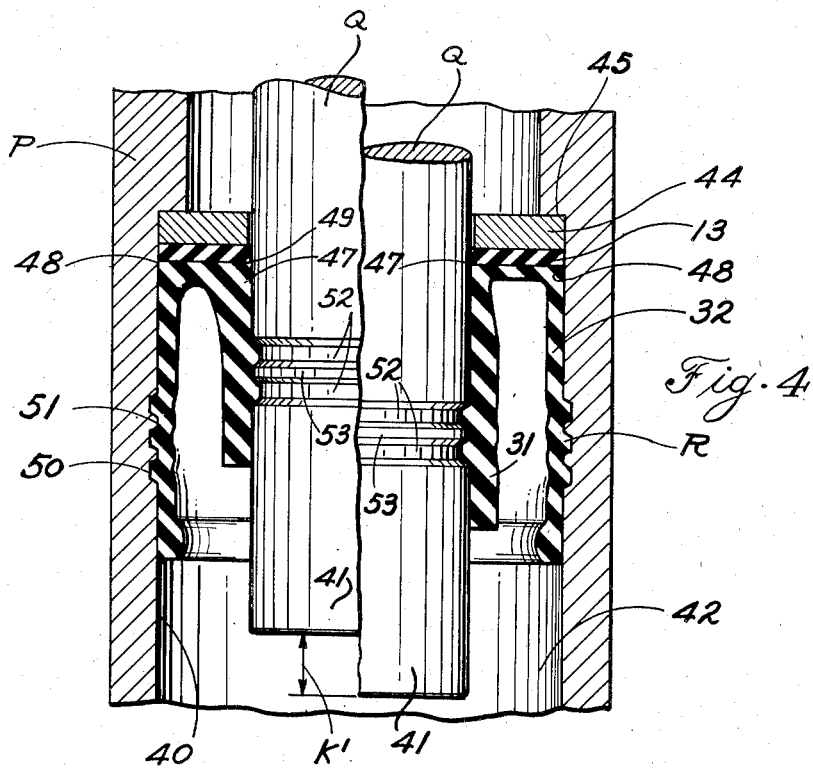
Figure 4 is a view corresponding to Figure 2 with, however, differently formed relatively longitudinally movable members with the seal of Figure 3 in coacting and sealing relation therewith.

Figures 3 and 4 illustrate a desirable way of practicing my invention when the abutment is carried by the outer of the members to be sealed and has motion relative to the inner member. In this form of my invention the flexible sealing element R corresponds to the seal S above described with however the relative relation of the thicker to the thinner legs reversed so that the inner leg 31 has the thickness and other characteristics of the outer leg 1 above described, with the tapered part 34 corresponding to the part 4 of the leg 1, the return bend 33 corresponding to the bend 3 and offset toward the thicker leg as in the seal S, and the leg 32 with its bead 37 corresponding to the leg 2 and bead 7; the upper part of the leg 32 flaring inwardly to join the bend 33 as the upper part of the leg 2 flares outwardly to join the bend 3. Here as is the case of the form of Figs. 1 and 2 the inside diameter of the leg 31 is preferably a little smaller than the outsider diameter of the surface 41 of the member Q, Fig. 4, and the outside diameter of the leg 32 is somewhat larger than the inside diameter of the surface 40 of the member P for the reasons and effects mentioned and discussed above; the members P and Q having grooves and lands 50, 51, 52 and 53 corresponding to the grooves and lands 20, 21, 22 and 23 for the same or substantially the same reasons and results described above.

In this form of my invention, however, the abutment 44 comprises a rigid annulus or washer suported on the shoulder 45 of the outer member P and has a free sliding fit with the surface 41 of the inner member Q. The hard rubber or rubber-like washer 13 may be the same as the washer 13 above described, being about 1 or 2 millimeters thick and hard, but is constrained by the abutment to have a snug static fit with the member P and snug sliding and wiping fit with the member Q; the washer 13 having substantially the same office and function in this form of my invention as in the form above described.

In this form of my invention the element R is shown in the right half of Fig. 4 in its least compressed condition and most nearly its initial first assembled form, corresponding complementarily to the state and condition described in the left half of Figure 2. As specifically depicted in the right half of Fig. 2 it is assumed that the space 42 within and below the seal R is under high operating pressure and the member Q is at the lowermost end of its stroke K' relative to the member P. Here the upper portions of the seal R are flattened against the adjacent surfaces of the members P and Q and washer 13 and angled at the corners 47 and 48 and in the condition of maximum but slight, if any, distention; the legs 31 and 32 having taken their uppermost, as viewed, fixed and fluid tight relations and engagements with the surfaces 40 and 41 and the lands and grooves thereof.

As the member Q moves upwardly, as viewed, see the left half of Fig. 4, relative to the member P through the stroke K' the stock of the seal in and adjacent the inner corner 47 is compressed and flattened in much the same way that the stock at and adjacent the corner 27 of the seal S was worked as above described. Here, as in the case of the downward relative movement of the member N, the inner annular edge 49 near the corner 47 tends to have little relative movement in relation to the washer 13 while, however, the surface 41 of the member Q has maximum sliding movement past the edge 49 while the latter is closely supported by the adjacent edge of the washer 13. The stock of the leg 31, and increasingly the upper parts thereof, flows into the corner 47 and part of the flattened bend 33 to accommodate the movement of the member Q to the upper, as viewed, end of the stroke K'; the outer annular increments of the surface of the leg 31 having a decreasing sliding relationship with the member Q and the lower portions of the surface of the leg 31 remaining in fixed adhesion to the member Q. Reversal of the stroke is characterized, as in the case of the seal S, by the "defattening" and decompressing of the upper inner portions of the seal R and the return of the seal to its substantially relaxed condition shown in the right half of the figure.

In connection with this form of my invention, but not as a necessary incident to its form per se, no lower abutment or abutments corresponding to the washer 25 and ring 26 are shown or employed. This is done to illustrate my teaching and practice that the lower abutments may be used or dispensed with, other conditions being substantially equal, according to the intended stroke K between the sealed members. I have found that with the values given for K in the tabulation above and under the conditions of operation herein described that the lowermost ends of the legs of either the seals S or R rarely need the support of the lower abutments, albeit prudence tends to suggest their employment in the event the intended stroke is exceeded or where the ends of the legs are subjected to the "wash" of rapidly moving fluid currents tending to separate the legs from the adjacent surfaces. For rule of thumb, I prefer to omit the lower abutments where the fluid to be sealed is relatively quiescent and the strokes K and K' do not exceed the values for K given in the tabulation. Otherwise my preference is that one or both the lower ends of the legs have an abutment like the washer 25 and ring 26.

The lengths of the strokes K and K' are stated conservatively in the tabulation above according to my greater preference, but I am not unaware that in the presence or absence of abutments for the lower ends of either or both legs as suggested in Fig. 4, the stroke may be measurably increased beyond the "extreme" limits mentioned as preferred without impairing the utility of my invention by increasing the relative movements of the sealed members in the directions which work the seals S and R in moderate degrees of tension at and adjacent the otherwise "relaxed" or fattened corners 27 and 47 respectively. That is to say, the member N may be moved upwardly, as viewed, relative to the member M from the condition shown in the left of Fig. 2 (and/or the member Q moved downwardly, as viewed, relative to the member P from the condition shown in the right of Fig. 4) as, for example, ⅓ K with the effect of thinning the corner 27 and the adjacent parts of the seal S and tending to slip the whole of the thicker leg upwardly along the surface 10, but as presently advised, not actually causing the lower part of the leg to slip nor inducing deleterious thinning of the corner 27 nor deleterious slippage of the part 3 of the seal across the washer 13 under high and nominal pressure conditions. On the other hand with the employment of an abutment 25 as in Figure 2 the stroke may be increased considerably above the tabulated values in the directions of increasing the compressing and fattening of the parts shown in the right half of Fig. 2 (and the left half of Fig. 4) for the reasons mentioned above and more fully agreeable to my greater preference in the premises.

While I have illustrated and described preferred forms of my invention, changes and modifications will occur to those skilled in the art who come to understand its uses and advantages, and therefore I do not care to be limited to the specific forms or illustrations of my invention herein specifically disclosed nor in any manner inconsistent with the promotion of progress in this art marked by my invention.

I claim:

1. The combination of two concentric coaxially disposed members having limited relative axial movement from one extreme position to the other and having respectively internal and external radially spaced juxtaposed cylindrical surfaces of different diameters, one of said members having an annular abutment secured thereto, said abutment being disposed transversely of the said cylindrical surface of said one member and having a sliding fit with the said surface of the other member, said surfaces and said abutment describing an annular space from which fluid under pressure is sought to be confined from escaping through said sliding fit, and a flexible, deformable, elastic, rubber-like, fluid impervious seal for confining said fluid under pressure substantially U-shaped in half longitudinal section and slidably disposed entirely within said space with the base of the U-section contacting said abutment and the legs of the U-section contacting said surfaces respectively adjacent said abutment and for less than the whole longitudinal extent of said sufaces remote from said abutment, said seal comprising an annular closed end portion forming the said base of the U-section and integrally formed concentric, coaxial, cylindrical, longitudinally extending, sleeve-like, radially spaced leg portions forming the said legs of the U-section and extending to the open end thereof and having smooth cylindrical faces engaging said surfaces of said members respectively adjacent said abutment and terminating short of the whole longitudinal extent of said surfaces and having substantial and appreciable net cross-sectional area exposed to fluid pressure tending to push said leg portions toward said abutment and having circumferentially stressed engagement with said surfaces but not substantially restrained from bodily movement relative to said surfaces in the direction toward said abutment whereby said seal as a whole is bodily insertable into said space and movable therein under fluid pressure toward and into forcible engagement with said abutment without developing substantial longitudinal tension in said leg portions or said annular portion, the leg of said seal, which engages the member that is slidable relative to said abutment, having engagement with said member resistant to movement along said surface in the direction away from said abutment when said abutment moves relatively toward the open end of said seal against the pressure of fluid in said seal, said last named leg having a part near said abutment having the tendency to deform by thickening when compressed by said last named relative movement of said abutment and thereby being increasingly responsive to fluid pressure in resistance to movement away from said abutment, said seal being positioned in said space without substantial longitudinal tension in the leg portions thereof when said abutment is at the extreme position of travel corresponding to the maximum size of said space, substantially all parts of said seal remote from said sliding fit tending to remain in fixed relation to said surfaces when said members and said abutment move to the opposite extreme position and reduce said space.

2. The combination of claim 1 in which said last named leg of said seal engaging the member with respect to which said abutment slides is thick in relation to the other portions of the seal and is resistant to wrinkling when said parts of said leg is compressed and thickened.

3. The combination of claim 1 in which the said part of the leg adjacent said fit is tapered to reduced thickness toward said fit when the compression in said part is a minimum.

4. The combination of claim 1 in which the leg that engages the surface of the member to which the abutment is secured has an internal thickened circumferentially stressed bead near the end thereof remote from said abutment tending to enhance the fixed engagement between said end of said leg and the surface of the member adjacent thereto.

5. The combination of claim 1 with means for holding the far end of the leg that is worked in compression against movement away from said abutment.

6. The combination of claim 1 with means inducing a state of longitudinal pre-compression in the leg that is worked in compression when said abutment is in the extreme position corresponding to maximum size of said space and tending to induce a minimum compression in said leg.

7. The combination of claim 1 in which one of said members has a shallow groove in its said surface overlaid by a leg portion of said seal.

8. The combination of claim 1 with a washer disposed between said abutment and said seal and having a tight sliding fit with the member not carrying said abutment, said washer being thin, harder than said seal and of limited deformability and of limited radial expansibility when high fluid pressure is imposed on said seal whereby to increase the tightness of the fit by a small amount under high fluid pressure.

References Cited in the file of this patent
UNITED STATES PATENTS

| | | |
|---|---|---|
| 1,964,745 | Sauzedde | July 2, 1934 |
| 2,219,566 | Sauzedde | Oct. 29, 1940 |